United States Patent
Thomas et al.

(10) Patent No.: US 10,440,542 B2
(45) Date of Patent: Oct. 8, 2019

(54) WIRELESS BATTERY MONITORING AND CONTROL SYSTEM FOR PARACHUTE DEPLOYMENT AND AUTO LOAD DISENGAGEMENT

(71) Applicants: George Thomas, Lawrenceville, GA (US); Sai Praturu, Suwanee, GA (US); Ajith N. Nair, Lawrenceville, GA (US); Venus Desai, Lawrenceville, GA (US)

(72) Inventors: George Thomas, Lawrenceville, GA (US); Sai Praturu, Suwanee, GA (US); Ajith N. Nair, Lawrenceville, GA (US); Venus Desai, Lawrenceville, GA (US)

(73) Assignee: NuGen Systems, Inc., Norcross, GA (US)

( * ) Notice: Subject to any disclaimer, the term of this patent is extended or adjusted under 35 U.S.C. 154(b) by 1 day.

(21) Appl. No.: 15/358,357

(22) Filed: Nov. 22, 2016

(65) Prior Publication Data
US 2017/0144562 A1    May 25, 2017

Related U.S. Application Data

(60) Provisional application No. 62/259,142, filed on Nov. 24, 2015, provisional application No. 62/259,193, filed on Nov. 24, 2015.

(51) Int. Cl.
*H02J 7/00* (2006.01)
*H04W 4/80* (2018.01)
(Continued)

(52) U.S. Cl.
CPC ............... *H04W 4/80* (2018.02); *B60L 58/12* (2019.02); *H01M 10/425* (2013.01); *H01M 10/4257* (2013.01); *H01M 10/48* (2013.01); *H02J 7/0047* (2013.01); *H01M 2010/4278* (2013.01); *H01M 2220/20* (2013.01); *H02J 2007/005* (2013.01); *H02J 2007/0096* (2013.01)

(58) Field of Classification Search
CPC . H04W 4/80; H01M 10/425; H01M 10/4257; H01M 10/48; H02J 7/0047; B60L 11/1861
USPC .......................... 320/106, 132, 152, 162, 164
See application file for complete search history.

(56) References Cited

U.S. PATENT DOCUMENTS

| 6,184,651 B1 | 2/2001 | Fernandez et al. | |
| 2001/0024105 A1* | 9/2001 | Abe ...................... | H02J 7/1415 320/132 |

(Continued)

*Primary Examiner* — Zixuan Zhou
(74) *Attorney, Agent, or Firm* — Bryan W. Bockop; Bockhop Intellectual Property Law, LLC

(57) ABSTRACT

A battery system includes a battery, a monitoring circuit, a wireless communication device and a remote wireless communication unit, and a deployable drone parachute. The monitoring circuit includes a processing unit and non-volatile memory that stores a unique identification of the battery. The wireless communication device is disposed on the battery and is in data communication with sensor circuits. The wireless communication device transmits real time operational parameter data sensed by the sensor circuits. The remote wireless communication unit is in wireless data communication with the wireless communication device and receives the operational parameter data therefrom.

20 Claims, 5 Drawing Sheets

(51) Int. Cl.
  *H01M 10/42*   (2006.01)
  *H01M 10/48*   (2006.01)
  *B60L 58/12*   (2019.01)

(56) References Cited

U.S. PATENT DOCUMENTS

| | | | |
|---|---|---|---|
| 2005/0162172 A1* | 7/2005 | Bertness | G01R 31/3648 324/426 |
| 2007/0216361 A1* | 9/2007 | Zelinski | H02J 7/0047 320/132 |
| 2009/0132186 A1* | 5/2009 | Esnard | G01R 31/3648 702/63 |
| 2012/0299721 A1* | 11/2012 | Jones | B60R 25/33 340/521 |

* cited by examiner

WIRELESS BATTERY MONITORING AND CONTROL SYSTEM FOR PARACHUTE DEPLOYMENT AND AUTO LOAD DISENGAGEMENT

CROSS-REFERENCE TO RELATED APPLICATION(S)

This application claims the benefit of U.S. Provisional Patent Application Ser. No. 62/259,142, filed Nov. 24, 2015, the entirety of which is hereby incorporated herein by reference.

This application also claims the benefit of U.S. Provisional Patent Application Ser. No. 62/259,193, filed Nov. 24, 2015, the entirety of which is hereby incorporated herein by reference.

BACKGROUND OF THE INVENTION

1. Field of the Invention

The present invention relates to battery monitoring and control systems and, more specifically, to a battery monitoring and control system with a wireless communication capability.

2. Description of the Related Art

Rechargeable batteries are used to power the electric vehicles (EVs), both in indoor and outdoor applications. Energy ratings of these batteries range from 0.5 kWh to 50 kWh for most vehicles. However, some electric vehicles use higher energy rated batteries. Batteries provide energy for the vehicle for propulsion. The stored energy in the battery is drained or discharged as the EV drives from one location to another. A typical EV design will have protocols and fuel gauging methods built into its system to determine the appropriate time to recharge the battery. The energy size of the battery is typically determined by the desired operating time of the electric vehicle. A battery's operating time usually has a direct relationship to the distance an EV can travel between re-charges and the load it carries.

The fundamental building block of a battery is referred to as a "cell." Different chemistries form the basis of different types of cells. Some of the common chemistries are Lead Acid, Nickel-Cadmium (Ni-CD), Nickel Metal Hydride (Ni-MH), and Lithium ion (Li-ion). A battery is built with multiple cells that are connected in series and/or parallel to get a desired voltage and capacity. A multi-cell stack of connected cells is called a "cell stack." Battery energy is a multiple of stack capacity and voltage.

Large size batteries in the kilo-Watt-hour (kWh) energy range are complex and may contain many electronic circuits to control and assist smooth functioning of a battery. Also, in some applications, several smaller independent batteries are connected in series and/or parallel to achieve multi-kWh batteries. In such scenarios, each of these independent batteries is called a "module."

A module can operate independently and it typically consists of a cell stack and management circuitry referred to as a "battery management system" (BMS). The BMS may contain circuits used to measure the charge going into the battery during a charge step and the charge coming out of the battery during a discharge step. This process is generally referred to as "coulomb counting." Coulomb counting is typically used to "fuel gauge" batteries.

A large size battery is constructed by combining many battery modules in parallel and/or in series to get the desired energy level (capacity times voltage). In such constructions there is a need to poll information contained in each of the modules to be supplied to the vehicle or to the charger. The term "charger" is a common term used in battery industry to charge a discharged battery.

Two sub-sets of electric vehicles include automatic guided vehicles (AGV), such as robotic transport vehicles, and human guided vehicles (MGV), such as pallet jacks and forklifts—both of which are typically indoor vehicles.

A control and communication module (CM) that is transposed between the battery modules and the vehicle and/or the charger carries out the functions of polling the data from each of the modules in the battery and supplying them to the vehicle or charger.

Typically, the required connections are implemented through a network of data cables. These cables can be cumbersome, costly, and inefficient, especially when many battery modules are involved.

Therefore, there is a need for a system to access battery data that does not use of physical cables connected to the battery.

SUMMARY OF THE INVENTION

The disadvantages of the prior art are overcome by the present invention which, in one aspect, is a battery system that includes a battery, a monitoring circuit, a wireless communication device and a remote wireless communication unit. The monitoring circuit includes a processor and a non-volatile memory that stores a unique identification of the battery. The wireless communication device is disposed on, or attached to, the battery and is in data communication with the sensor circuit. The wireless communication device transmits real time operational parameter data sensed by the sensor circuit. The remote wireless communication unit is in wireless data communication with the wireless communication device and receives the operational parameter data therefrom.

In another aspect, the invention is a system for monitoring and controlling a battery. A battery monitoring circuit is disposed on, or attached to, the battery and is electrically coupled to the battery. The battery monitoring circuit is configured to sense operational parameters from the battery and includes: a memory that stores a unique identification of the battery and a processor that maintains a count of coulombs flowing into the battery and a count of coulombs flowing out of the battery so as to calculate a state of charge of the battery. The monitoring circuit includes at least one sensor selected from a list consisting of: a voltage sensing circuit that detects a voltage between two terminals of the battery; a current sensing circuit that detects battery current; a battery temperature sensor; a smoke detector, a location sensor, humidity sensor, 3-axis accelerometer, or 3-axis gyroscope. A wireless communication device is disposed on, or attached to, the battery and is in data communication with the sensor circuits. The wireless communication device transmits real time operational parameter data sensed by the sensor circuit. The wireless communication device is a device selected from a list consisting of: a wireless local area network device; a short range wireless interconnection device; a radio frequency device; and a device complying with a near field communication standard. A remote wireless communication unit is in wireless data communication with the wireless communication device and receives the operational parameter data from the wireless communication device.

In yet another aspect, the invention is a method of managing a battery, in which at least one operational parameter is sensed from the battery. Data corresponding to the operational parameters to a remote wireless communication unit is transmitted wirelessly. The data is analyzed and at least one control instruction based thereon is generated. The at least one control instruction is transmitted from the remote wireless communication unit to a device that is physically coupled to the battery. An operational aspect of the battery is changed in response to the control instruction.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1:
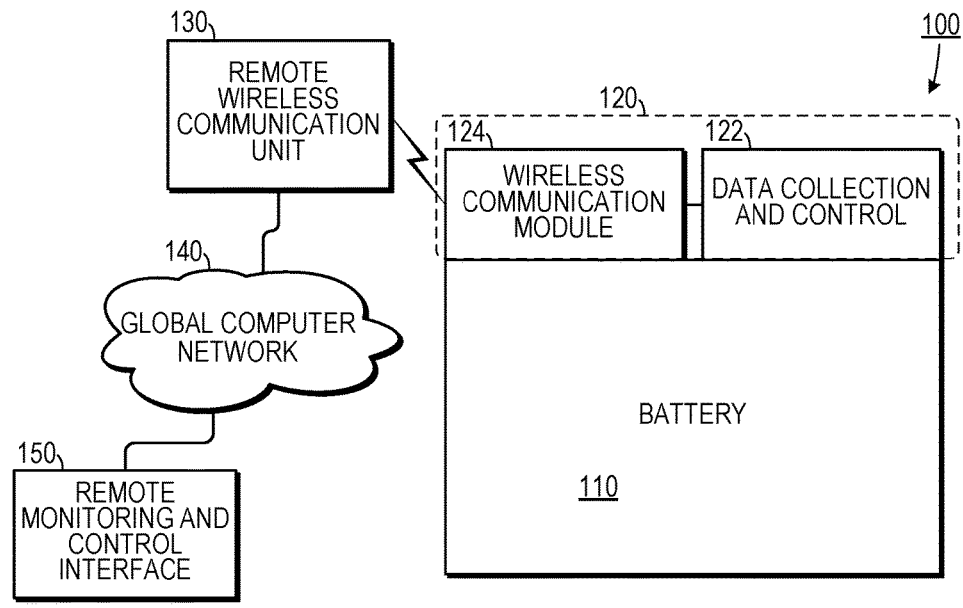
FIG. 1 is a schematic diagram of one embodiment of a battery system

A preferred embodiment of the invention is now described in detail. Referring to the drawings, like numbers indicate like parts throughout the views. Unless otherwise specifically indicated in the disclosure that follows, the drawings are not necessarily drawn to scale. As used in the description herein and throughout the claims, the following terms take the meanings explicitly associated herein, unless the context clearly dictates otherwise: the meaning of "a," "an," and "the" includes plural reference, the meaning of "in" includes "in" and "on." Also, as used herein, "global computer network" includes the Internet.

The present invention employs at least one wireless communication device (WCD) that is embedded in a battery module, inside the battery module packaging or box, and that is connected to the BMS. The BMS stores data from each cell in the cell Stack continuously to a memory bank or banks in the BMU circuitry. The wireless communication device polls data from the memory bank and sends it to a remote station, to a host, to a charger, or to devices in a global computer network. Wireless communication devices can be placed in each of the components of a system to increase the efficiency of the system. This method allows a cloud-based monitoring and management of batteries that are linked by various WCDs.

As shown in FIG. 1, one embodiment of a battery system 100 includes a battery 110 and an associated battery monitoring and control system 120. The battery monitoring and control system 120 includes a data collection and control circuit 120 and a wireless communication module 124. The data collection and control circuit 120, which includes a unique identifier that uniquely identifies the battery and monitors operational parameters (for example: current into the battery; current out of the battery; temperature; smoke presence; position; and acceleration). The battery monitoring circuit maintains a count of coulombs flowing into the battery 110 and a count of coulombs flowing out of the battery 110, which allows it to keep track of the current state of charge of the battery 110 and determine where the battery 110 currently is in its lifecycle.

The wireless communication module 124 receives data from the battery monitoring and control system 120 and transmits it through a wireless communication channel to a remote wireless communication unit 130. The data includes real time operational parameter data associated with the battery. The wireless communication device 124 can be from one of many wireless technologies, such as: a wireless local area network device; a short range wireless interconnection device; a radio frequency device; and a device complying with a near field communication standard.

Figure 2:
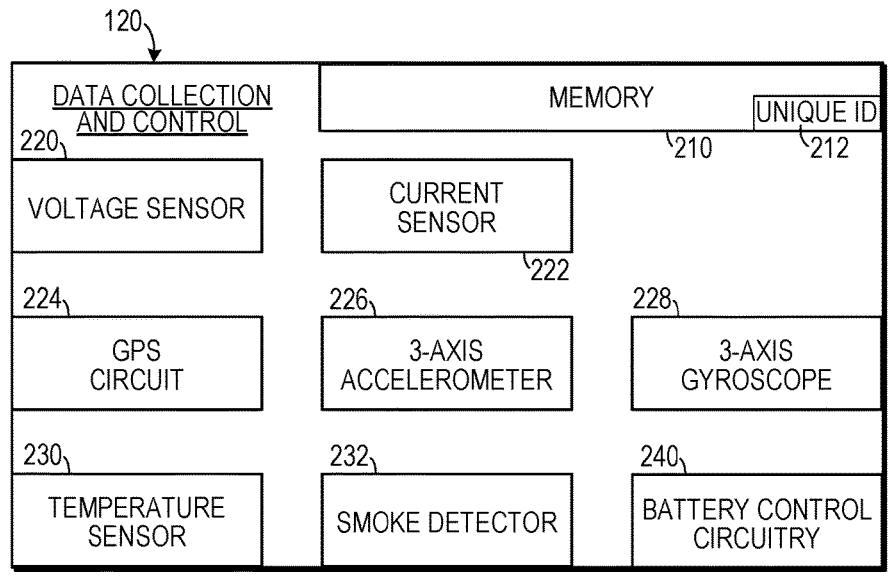
FIG. 2 is a schematic diagram of one embodiment of a data collection and control module.

As shown in FIG. 2, the data collection and control circuit 120 can include such battery parameter sensors as: a voltage sensing circuit 220 that detects a voltage between two terminals of the battery; a current sensing circuit 222 that detects battery current; a battery temperature sensor 230; a smoke detector 232; a global positioning system circuit 224; a 3-Axis accelerometer circuit 226; and a 3-Axis gyroscope 228. The data collection and control circuit 120 includes a memory 210 for local data storage and for storing a identifier 212 that identifies each battery uniquely within the system.

The data collection and control circuit 120 may also include battery control circuitry 240 that can execute battery control commands when certain operating conditions are detected. The control circuit 240 can receive control instructions from the remote wireless communication unit 130 and can change operational aspects of the battery in response to the control instructions. Such changes in operational aspects can include: disconnecting the battery 110 from a load when the number of remaining coulombs in the battery 110 falls below a predetermined threshold and disconnecting the battery 110 from a charger when certain parameters, such as high temperature, are sensed.

Figure 3:
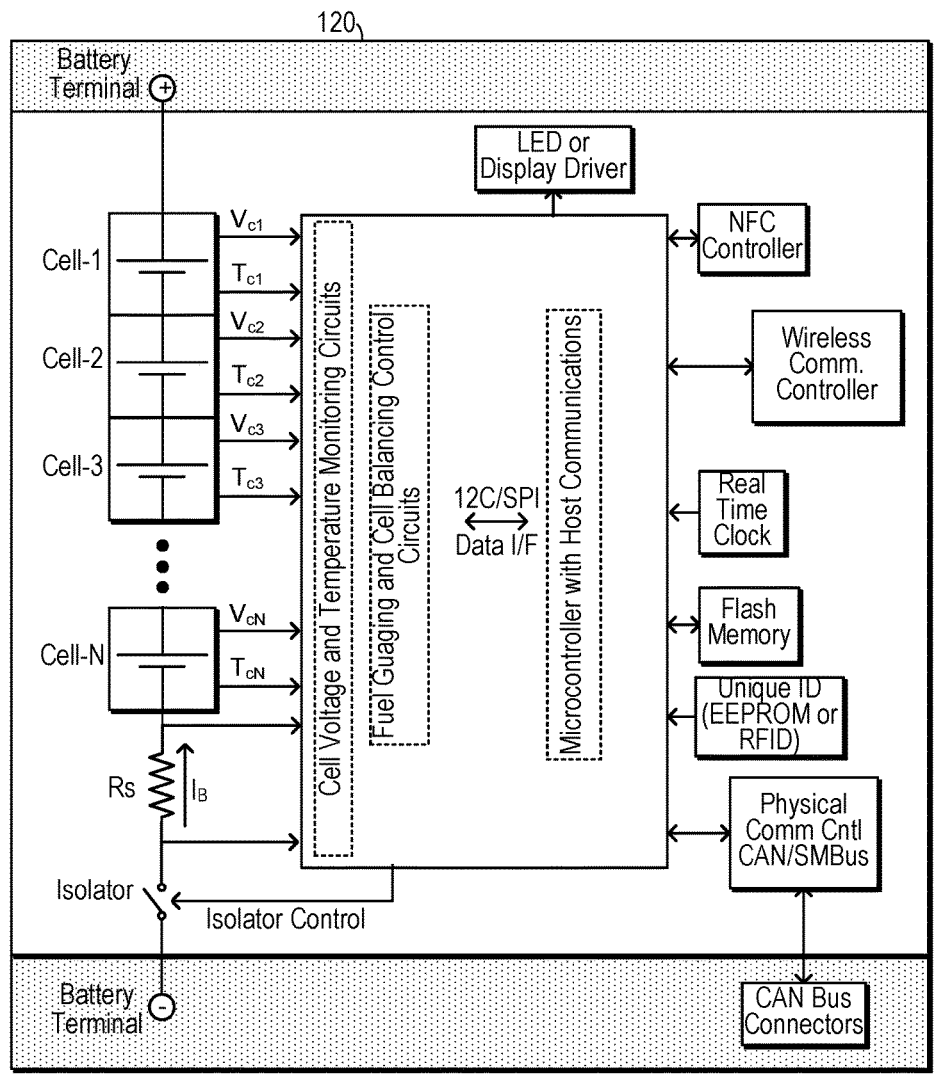
FIG. 3 is a detailed schematic of one embodiment of a battery system.

A more detailed diagram of the data collection and control circuit 120 is shown in FIG. 3 (which is discussed in more detail below).

Returning to FIG. 1, the remote wireless communication unit 130 can be coupled to the global computer network 140, which allows for "cloud" based control from a remote monitoring and control interface 150. In one embodiment, the remote monitoring and control interface 150 can include a device such as a monitoring station computer, a portable computer, a smart phone, etc.

The remote monitoring and control interface 150 can include a processor that analyzes operational parameter data received from the remote wireless communication unit 130 and that generates battery control commands based on the analysis.

In one embodiment, the processor calculates a number of remaining coulombs that can be expended by the battery 110 until a next charge will be required for the battery. In another embodiment, the processor calculates where the battery is in the predetermined life cycle based on a cumulative number of coulombs that have been input to the battery and generates an output indicating an estimate of when the battery 110 should be replaced.

In use with automatic guided vehicles (AGVs), the monitoring and control system 120 will transmit the required instructions to the AGV during its operation or drive. The duration of the drive is controlled by a pre-determined end value of the DOD (depth of discharge) of the battery that is connected to an AGV. The monitoring and control system 120 monitors the increase in the DOD of the battery using the polled data from the individual FGs of each battery module and it will transmit instructions to the AGV to stop the work and move to the charger at the appropriate DOD value. The duration of the drive of the AGV can be controlled by a pre-determined time as long as the DOD of the battery does not encroach on the reserve capacity of the battery.

The monitoring and control system 120 can transmit instructions to the charger including the mating and charging protocols that are stored in the system. The charge step can be controlled and terminated by the monitoring and control system 120 by monitoring the charge time and using the polled data from the individual fuel gauging devices of each battery modules and comparing with the instructions stored in the system. Using a wireless communication device in the charger can transform it into a remote programmable charger that can send out signal to the system regarding the progress of the charging step.

One embodiment of a battery management system (BMS) that is part of the monitoring and control system 120 is shown in FIG. 3, which is adapted especially for use with a Li-ion battery where individual cells are connected in series (generally, there is no limit to the number of cells that can be electrically connected in series in a battery module as shown by Cell-1, Cell-2, and Cell-3 to Cell-N). The voltages and temperature of all cells are monitored by the BMS and are registered in the BMS for control and management purse. A Fuel Gauging circuitry can be part of the BMS. The BMG-FG circuitry is connected to a microcontroller which serves the main controller for communication to a vehicle (or other load) or to a charger. The microcontroller is powered from the cell-stack. This microcontroller can be run specialized firmware to read the parametric values from the sensors and associate time of the events and store in a predetermined tabular format in a flash memory.

In one embodiment, the wireless communication device (WCD) can include a Wi-Fi device connected to the microcontroller. In another embodiment, the WCD can be a Bluetooth or an RF device connected to the microcontroller.

The WCD can draw power from the battery directly and does not need additional power source. These devices typically "sleep" most of the time in a "listening" mode has the capability to either send data on its own timed basis or wait till it gets a "ping" or a query from an external control station requesting data. At that instant the device "wakes up" and performs the required function and transmit the data in the required format to the external control station. The device goes back to "sleep" after the work is completed. The WCD also transmits an alarm if it gets a signal on any out-of-control conditions that may develop inside the battery module or in any of the "things" in the system. Thus, the communication device goes through a "sleep", "wake", and "work", "transmit" and "sleep" cycle.

A real-time clock (RTC) is also attached to the microcontroller for time stamping. The RTC is powered by the Cell Stack and no need for separate battery or power source. The RTC may be initialized with correct Year/Date/Time values at the time of manufacturing and will maintain real time based on the oscillations of the crystal connected to it. The RTC data id read to mark the time of events that happen to the battery and stored in the flash memory in the BMU.

Temperature monitoring is enabled via sensors located on the cells or inside the battery module housing or in areas where the battery may be subjected to thermal stress. Temperature data can be stored locally on the non-volatile memory and can then be relayed via the wireless communication device as needed.

The unique battery identification can be stored, for example, on an EEprom or by using an RFID. Each battery will be initialized with a unique identifier. This unique ID may be used to recognize the battery to the user and or to the devices connected in the system network.

In one embodiment, a near field communication (NFC) controller is additionally embedded in the battery module and tied to the microcontroller. The NFC could serve as a means to transfer instructions or data from CM to the vehicle or to the charger. The microcontroller can be configured to display the data or instructions using the LED or display driver of the battery module. The battery module can be fitted with a set of physical controllers with a controller area network ("CAN") bus or a system management ("SM") bus communication protocols if the battery module is required to operate in an environment where the wireless transmission channels are not available and in such a scenario the systems will be connected by using data cables.

Typically, large batteries are used to power electrical vehicles, in both outdoors and indoors applications. Battery modules with WCDs are connected electrically in parallel to increase the battery capacity. In a similar way, many battery modules with WCDs are connected electrically in series to increase the Battery voltage to a desired value. Also, many battery modules can be connected in parallel and the parallel string of battery modules can be connected in series to increase the capacity and voltage of the battery. A decision on the number modules that need to be connected together in parallel or in series or a combination is made on the basis of the vehicle type and the desired drive time of the vehicle while carrying a certain load.

Figure 4:
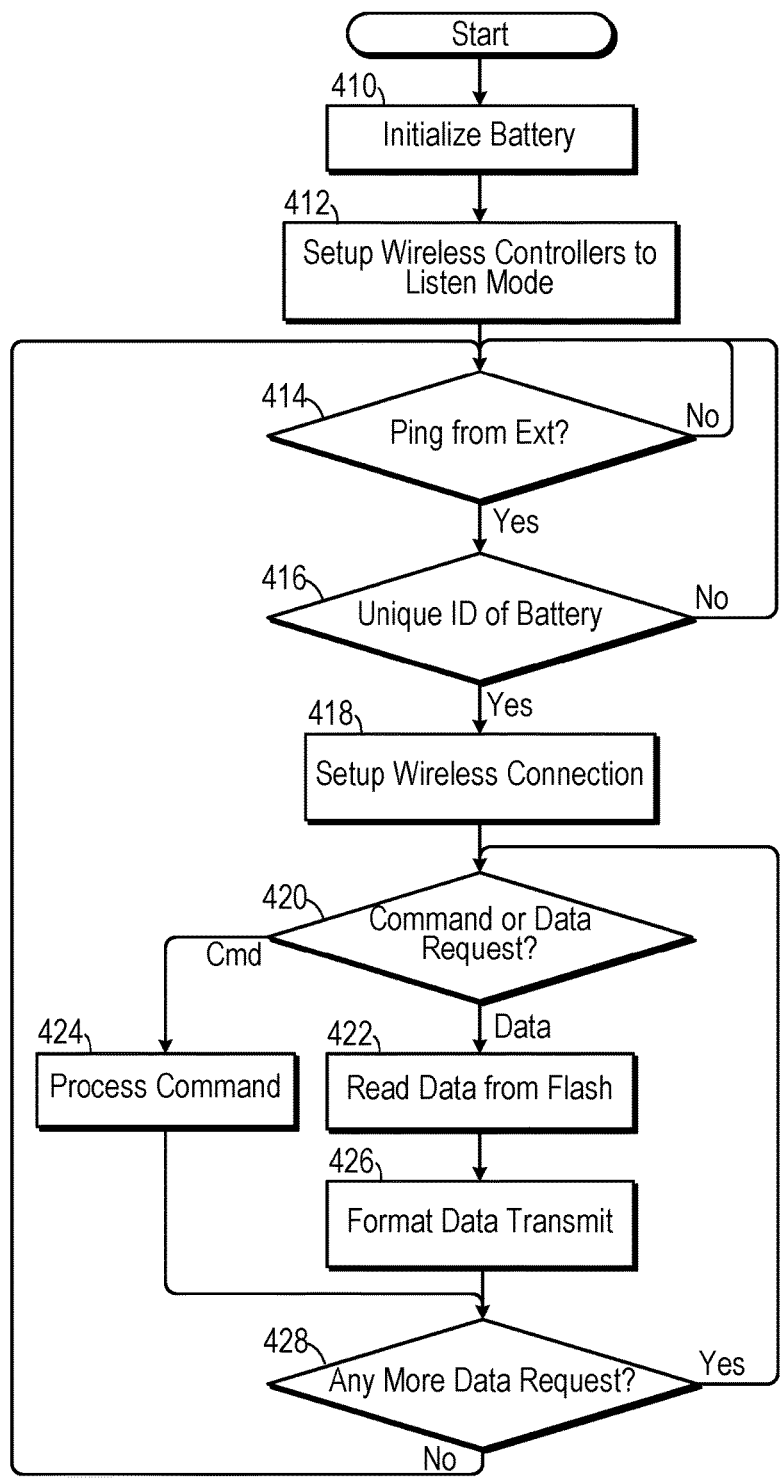
FIG. 4 is a flowchart showing one method for monitoring a battery.

The process of activation and use of the monitoring and control system 120 can be understood with the aid of the flowchart shown in FIG. 4. Various devices with wireless communication devices can be programmed to form a network of wireless enabled internet of things, such as battery modules, CM, vehicles, chargers, etc. To save power, the wireless communication devices (WCDs) are typically set up in the "listen" mode 412 after the initialization 410. In the listen mode, the WCDs are capable of accepting enquiries ("pings") 414 from another "thing" in the network or from a device connected to the same wireless network and perform that function and goes back to the listening mode. The WCDs can be programmed to collect data from the Flash memory of the BMS under a pre-determined time interval.

Each battery module which has its own unique device ID can be polled for data from a remote host 416 and its health status and alarm conditions extracted for further analysis. Unique device ID's coupled with Geo-tagging enables easy location of the battery module in large ware house management and fleet management applications. Inter-module communications can be a combination of wired communication protocols using high speed serial formats like SPI/I2C, etc. and also use wireless mechanisms for modules which are spatially separated.

When a device pings 414 another device and receives the unique battery identification, a wireless connection is set up 418 and the system determines whether a command request or a data request has been received 420. If a command has been received, the system will process the command 424. If a data request has been received, the system will read the requested data from memory 422, format it and then transmit it 426. The system will determine if more data is requested 428 and, if so, it will return to step 420; if not, it will return to step 414.

Figure 5:
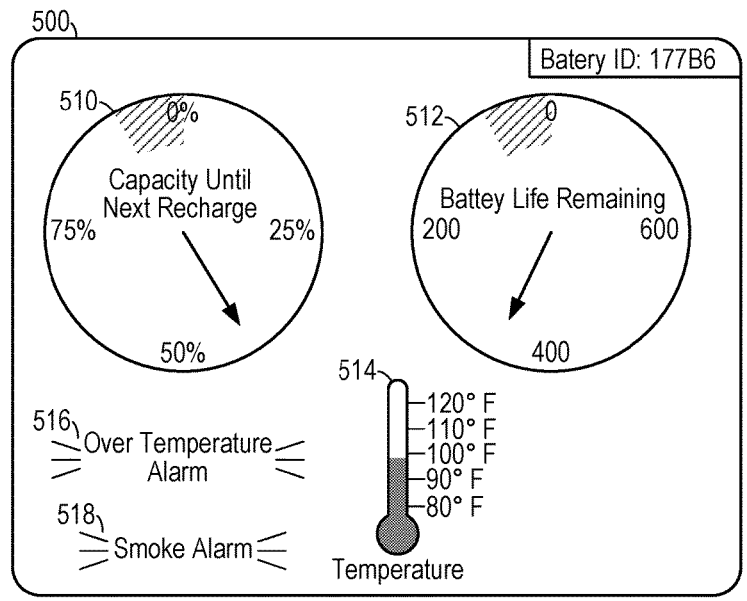
FIG. 5 is a schematic diagram of one embodiment of a battery monitoring dashboard.

As shown in FIG. 5, the remote monitoring and control interface 150 can generate a battery status "dashboard" 500 that is output onto a computer monitor. The dashboard 500 can include graphical displays of such parameters as battery capacity until next recharge 510, battery life cycle remaining 512 (i.e., life until battery replacement), and battery temperature 514, and any parameter relevant to the specific application. The dashboard 500 can also include battery-related alarms, such as a battery over-temperature alarm 516 and a smoke alarm 518 (which could detect smoke generated by the battery 110 or smoke sensed around the battery 110).

A real-time clock (RTC) can also be attached to the microcontroller for time stamping. The RTC implementation may be initialized with correct Year/Date/Time values at the time of manufacturing and will maintain real time based on the oscillations of the crystal connected to it. The RTC data can be read to mark the time of events that happen to the battery and stored in the flash memory in the BMS.

Excessive vibration can be harmful to a battery. Batteries are typically designed and assembled to withstand normal vibrations that are experienced in the environment where the battery is operated or used. Returning to FIG. 3, a sensor device capable of measuring the vibration can be incorporated inside the battery module and is connected to the microcontroller of the BMS. A device to sense the vibration (such as an accelerometer) and a device to measure frequency, a means to record the data into a permanent memory can be included. The size of the signal that is proportional to the acceleration applied to it. The data may be transmitted to external control station in a predetermined time interval using the wireless communication device (WCD) of the battery module. If the sensor detect larger than normal displacement such as that may be experienced in the event of the battery dropped suddenly to a surface which is more than one foot, the sensor system will be able to automatically transmit an alarm to the external control station.

One problem experienced with indoor automatic vehicles is the possibility of fires occurring in indoor facilities where the vehicles may be operating. Impingement of external fire to the battery must be avoided because batteries, especially Li-ion batteries, can cause secondary damage to the surroundings if the batteries catch fire. It is also possible that a failure inside a battery module can start a fire inside which can spread outside. Therefore one embodiment can include a smoke detector inside the battery and a method to transmit alarms in appropriate situations.

A "gas and smoke sensor" can be included inside the battery housing to detect smoke and/or gases that can be produced when the battery overheats and fails. This event also will be stored in the BMS memory along with event time. The smoke detecting sensor can sense an approaching fire in the vicinity of the batteries. The battery modules could be connected to the vehicle or to a charger. It is possible that the battery modules are stored in warehouses.

Many battery modules typically have openings for heat transfer to the atmosphere to cool down the battery if a predictable amount of heat is produced inside the battery due to the normal use of the battery. In one embodiment, the holes on the walls of the battery modules are used to sense external vapors such as smoke and/or organic vapors. Smoke and other organic vapors can indicate possible fire nearby the battery and other abnormalities associated with the battery. The smoke detector senses the smoke, measure its intensity, and continuously monitor and record the data over a time period. If the intensity of the smoke decreases, the sensing activity or the recording activity reduces. On the other hand, if the intensity of the smoke is increasing over a time period, the measuring frequency increases and it will automatically transmit a distress signal to the external control station.

The smoke and vapor sensor can be used for detecting internal failures at its initial stages. If an unexpected internal thermal failure condition develops inside the battery module, it will result in the leakage of organic fumes from the Li-ion battery cells. The smoke and vapor sensor will sense such vapor and or smoke arising from within the battery. The battery will transmit the distress signal to an external control station, if the conditions exceed the pre-set tolerance level. Typically the time to transmit such distress signal is much shorter than the time the battery will use to develop an internal thermal runaway condition and, thus, the system can be used to prevent thermal runaway conditions.

A sensor to sense the humidity level inside the battery module can be included. The humidity sensor can be mounted inside the battery housing to detect unusual humidity levels from water leakage into the battery. Excessive humidity inside the battery module is harmful to many components in the battery modules especially to the Li-ion cells. In one example of such a device, a single-chip relative humidity measurement device can be incorporated into the BMS. The humidity sensor will continuously record the data into the memory banks of the BMS and will transmit the data to external control stations at predetermines intervals using the WCD inside the battery module.

All the sensors can be connected to a microcontroller. The microcontroller runs firmware or software to read the parametric values from the sensors and associate time of the events and store in a predetermined tabular format in the flash memory. Each battery will be initialized with a unique identifier. The unique ID may be used to recognize the battery to the user and the network.

Multiple wireless communication methods can be used. Examples include: compact 802.11 b/g/n Wi-Fi controller, a Near Field Communication (NFC) controller or a Blue Tooth controller or a RF controller. The Wi-Fi, NFC, RF and BT controllers are interfaced to the system microcontroller through a serial data interface. The unique ID that is stored in the Flash is used to generate the unique SSID for a battery module for communication with the external world.

An NFC device can also be mounted on the inside of the battery housing. The NFC capability is used to read health parameters of a battery module with a smart device such as a smart phone or tablet. This interface also can be used to initialize the parameters such as unique ID, time, SSID etc.

The system can include a network of sensors installed inside a battery module and is connected to the microcontroller of the battery module. One or more WCDs are also connected to the microcontroller. Thus the microcontroller is capable of transmitting the signals from the various sensors in the battery module to outside world using one of the available WCD. This feature allows the battery to send alarms when such conditions arise.

Figure 6:
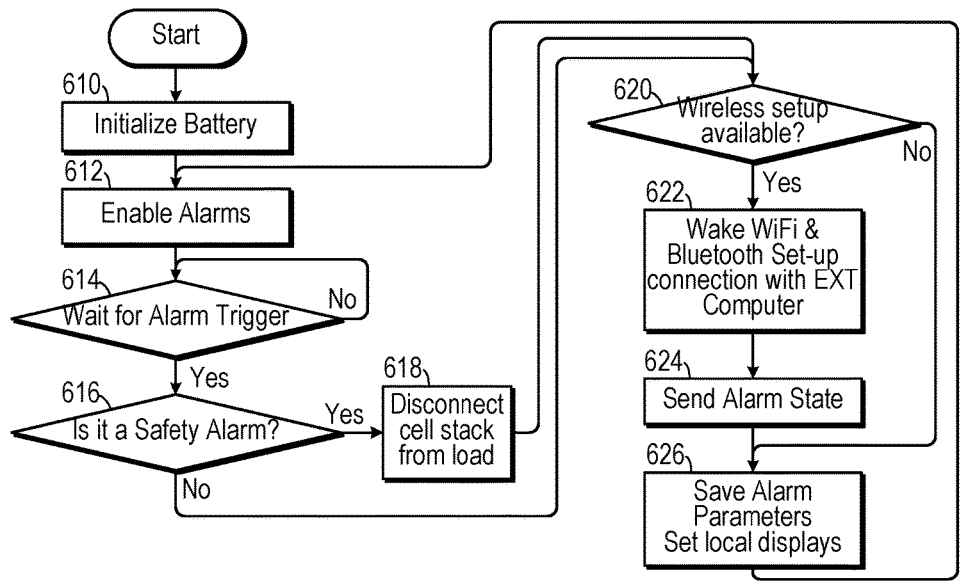
FIG. 6 is a flowchart showing method for managing battery-related alarms.

As shown in FIG. 6, in one method of monitoring a battery, the system is initialized 610 and alarms are enabled 612. The system waits for an alarm trigger 614 and, upon receipt, determines if the alarm is a safety alarm 616. If so, the system will disconnect the relevant cell stack from the load 618. Otherwise, it will go on to determine if wireless communications are currently available 620 and, if so, it will wake the wireless communication device 622 and transmit the alarm state 624. It will also save the alarm parameters and output the information on any local displays 626.

The main controller can be set up to be interrupted by alarm conditions such as over the limit temperature, over/under voltage limits from individual cells etc. When an alarm condition is triggered, the controller will check to see if it is a safety condition that requires isolating the cell stack from the battery and if it is, the load is isolated from the cell stack. The term "load" includes a vehicle or to a charger that may be connected to the battery module or modules or to the CM.

If it is not a safety alarm and only a cautionary alarm such as sudden drop, presence of excessive humidity, detection of smoke etc., then it goes to a general alarm processing step. The controller checks if a wireless setup is available in this battery. If wireless setup is available it wakes up the wireless controllers to full operational mode and sets up a connection to the external controller.

Once the wireless communication is setup, the alarm state is send to the controller and goes to the alarm state saving step. In the case of situations where a wireless setup is not available, the alarm state along with time code is saved to the flash memory and it will initiate a local alarm process which can include a flashing light and sound.

Figure 7:
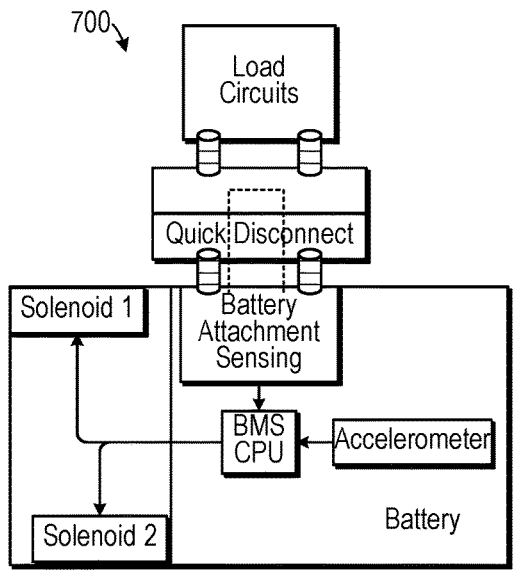
FIG. 7 is a schematic diagram of one embodiment of a system for deploying a parachute from a battery associated with a drone.
Figure 8A:
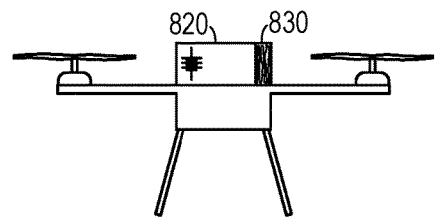
FIGS. 8A and 8B are schematic diagrams demonstrating battery deployment and separation from a drone.
Figure 8B:
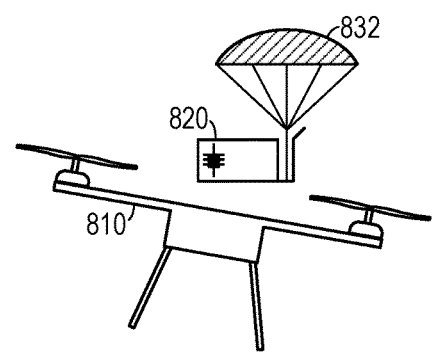
Figure 9:
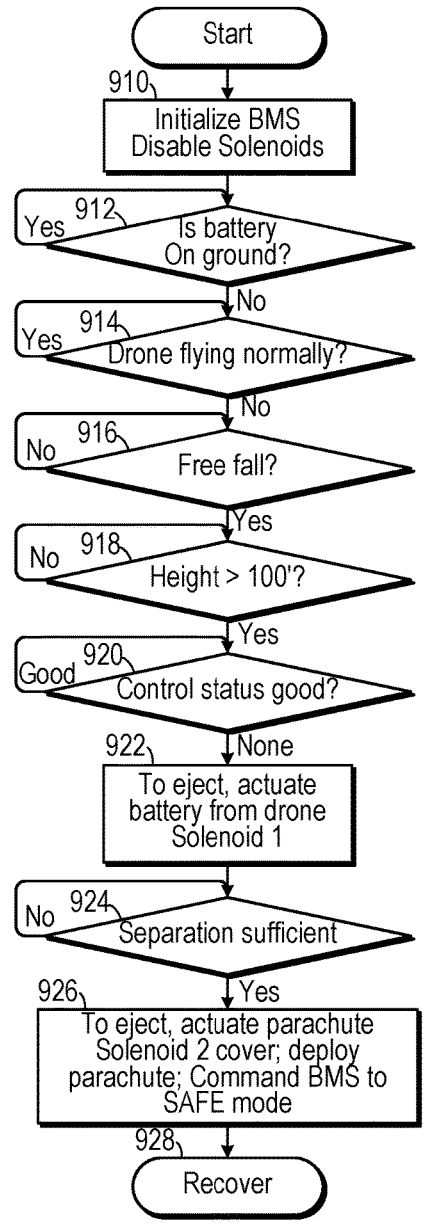
FIG. 9 is a flowchart showing one method for deploying a parachute associated with a battery.

As shown in FIGS. 7-9, in one embodiment the battery monitoring and control unit can be used to deploy parachute 832 that is attached to the battery 820 when the available charge in the battery 820 falls below a predetermined threshold or when the battery monitoring and control unit abnormal deceleration of the battery 820 when in motion. This embodiment could be particularly useful when the battery 820 is used to power a remotely-controlled drone 810. If the system determines that it is not in control or if the drone 810 is in a free fall mode and if it is at a height that allows the safe ejection of the battery 820, the parachute 832 can be deployed to slow its fall. In such a situation, it may be useful to eject the battery 820 from the drone 810 if the battery monitoring and control unit determines that the battery is failing or likely to fail. Given the batteries tend to be heavy; deploying the parachute 832 in such a situation can make drone use safer.

In this embodiment, as shown in FIG. 9, when the battery monitoring system is initialized, the ejection and deployment solenoids are disabled 910 and the system determines if the battery is on the ground 912. If not, it determines if the drone if flying normally 914. When it is not, the system determines if it is in free fall 916 and, if it is, it determines if it is at more than a predetermined elevation 918. If the control status is not good 920, the system ejects the battery from the drone by activating solenoid 1 922. If sufficient separation is detected 924, then the system will deploy the parachute by actuating solenoid 2 926, which controls the parachute cover. The battery management system is also placed in a "safe" mode. Then the battery is recovered 928.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A battery system, comprising:
   (a) a battery;
   (b) a monitoring circuit including a memory that stores a unique identification of the battery and at least a selected one of a battery temperature sensor and a smoke detector that monitors at least one operational parameter associated with the battery;
   (c) a wireless communication device, disposed on the battery and in data communication with the monitoring circuit, that transmits the real time operational parameter data sensed by the selected one of the battery temperature sensor and the smoke detector; and
   (d) a remote wireless communication unit in wireless data communication with the wireless communication device that receives the operational parameter data therefrom;
   (e) a processor that receives the operational parameter data from the remote wireless communication unit and that is configured to analyze the battery,
      wherein the processor calculates a number of remaining coulombs that can be expended by the battery until a next charge will be required for the battery, and
      wherein the computer is configured to cause the remote wireless communication unit to transmit a signal that causes the battery to be disconnected from a load when the number of remaining coulombs falls below a predetermined threshold.

2. The battery system of claim 1, wherein the wireless communication device comprises a device selected from a list consisting of: a wireless local area network device; a short range wireless interconnection device; a radio frequency device; and a device complying with a near field communication standard.

3. The battery system of claim 1, wherein the monitoring circuit further comprises at least one sensor selected from a list consisting of: a voltage sensing circuit that detects a voltage between two terminals of the battery; a current sensing circuit that detects battery current; a global positioning system circuit; a 3-Axis accelerometer circuit; and a 3-Axis gyroscope.

4. The battery system of claim 1, wherein the monitoring circuit maintains a count of coulombs flowing into the battery and a count of coulombs flowing out of the battery so as to calculate a state of charge of the battery.

5. The battery system of claim 1, wherein the remote wireless communication unit is in communication with a global computer network and further comprising a remote monitoring and control interface that is operable on a device other than the remote wireless communication unit that is in communication with the global computer network.

6. A battery system, comprising:
   (a) a battery;
   (b) a monitoring circuit including a memory that stores a unique identification of the battery and at least a sensor circuit that monitors at least one operational parameter associated with the battery;
   (c) a wireless communication device, disposed on the battery and in data communication with the monitoring circuit, that transmits the real time operational parameter data sensed by the sensor circuit;

(d) a remote wireless communication unit in wireless data communication with the wireless communication device that receives the operational parameter data therefrom;

(e) a processor that receives the operational parameter data from the remote wireless communication unit and that is configured to analyze the battery, wherein the computer processor calculates a number of remaining coulombs that can be expended by the battery until a next charge will be required for the battery, and wherein the computer is configured to cause the remote wireless communication unit to transmit a signal that causes the battery to be disconnected from a load when the number of remaining coulombs falls below a predetermined threshold.

7. The battery system of claim 6, wherein the wireless communication device comprises a device selected from a list consisting of: a wireless local area network device; a short range wireless interconnection device; a radio frequency device; and a device complying with a near field communication standard.

8. The battery system of claim 6, wherein the monitoring circuit further comprises at least one sensor selected from a list consisting of: a voltage sensing circuit that detects a voltage between two terminals of the battery; a current sensing circuit that detects battery current; a global positioning system circuit; a 3-Axis accelerometer circuit; and a 3-Axis gyroscope.

9. The battery system of claim 8, wherein the monitoring circuit maintains a count of coulombs flowing into the battery and a count of coulombs flowing out of the battery so as to calculate a state of charge of the battery.

10. The battery system of claim 6, wherein the remote wireless communication unit is in communication with a global computer network and further comprising a remote monitoring and control interface that is operable on a device other than the remote wireless communication unit that is in communication with the global computer network.

11. The battery system of claim 6, wherein the monitoring circuit comprises control circuitry is configured to receive at least one control instruction from the remote wireless communication unit and configured to change an operational aspect of the battery in response to the control instruction.

12. The battery system of claim 6, wherein the battery has a predetermined life cycle and wherein the computer calculates where the battery is in the predetermined life cycle based on a cumulative number of coulombs that have been input to the battery.

13. The battery system of claim 6, further comprising a parachute that is coupled to the battery and a control circuit, in data communication with the battery monitoring circuit, that is configured to eject the battery and deploy the parachute when the system detects an abnormal deceleration.

14. A battery system, comprising:
(a) a battery;
(b) a monitoring circuit including a memory that stores a unique identification of the battery and at least a sensor circuit that monitors at least one operational parameter associated with the battery;
(c) a wireless communication device, disposed on the battery and in data communication with the monitoring circuit, that transmits the real time operational parameter data sensed by the sensor circuit;
(d) a remote wireless communication unit in wireless data communication with the wireless communication device that receives the operational parameter data therefrom; and
(e) a parachute that is coupled to the battery and a control circuit, in data communication with the battery monitoring circuit, that is configured to eject the battery and deploy the parachute when the system detects an abnormal deceleration.

15. The battery system of claim 14, wherein the wireless communication device comprises a device selected from a list consisting of: a wireless local area network device; a short range wireless interconnection device; a radio frequency device; and a device complying with a near field communication standard.

16. The battery system of claim 14, wherein the monitoring circuit further comprises at least one sensor selected from a list consisting of: a voltage sensing circuit that detects a voltage between two terminals of the battery; a current sensing circuit that detects battery current; a global positioning system circuit; a 3-Axis accelerometer circuit; and a 3-Axis gyroscope.

17. The battery system of claim 16, wherein the monitoring circuit maintains a count of coulombs flowing into the battery and a count of coulombs flowing out of the battery so as to calculate a state of charge of the battery.

18. The battery system of claim 14, wherein the remote wireless communication unit is in communication with a global computer network and further comprising a remote monitoring and control interface that is operable on a device other than the remote wireless communication unit that is in communication with the global computer network.

19. The battery system of claim 14, wherein the monitoring circuit comprises control circuitry is configured to receive at least one control instruction from the remote wireless communication unit and configured to change an operational aspect of the battery in response to the control instruction.

20. The battery system of claim 14, wherein the battery has a predetermined life cycle and wherein the computer calculates where the battery is in the predetermined life cycle based on a cumulative number of coulombs that have been input to the battery.

* * * * *